United States Patent
Suga

(10) Patent No.: US 8,547,573 B2
(45) Date of Patent: Oct. 1, 2013

(54) IMAGE FORMING APPARATUS HAVING A MASTER-SLAVE CONFIGURATION AND CONTROL METHOD THEREFOR, AND CONTROL PROGRAM FOR IMPLEMENTING THE METHOD

(75) Inventor: Daisuke Suga, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1345 days.

(21) Appl. No.: 11/939,033

(22) Filed: Nov. 13, 2007

(65) Prior Publication Data

US 2008/0123134 A1    May 29, 2008

(30) Foreign Application Priority Data

Nov. 27, 2006  (JP) .................................. 2006-318659

(51) Int. Cl.
  *G06F 3/12* (2006.01)
  *G06F 15/00* (2006.01)
  *G06K 1/00* (2006.01)

(52) U.S. Cl.
  USPC ........................... 358/1.15; 358/1.13; 358/1.9

(58) Field of Classification Search
  None
  See application file for complete search history.

(56) References Cited

U.S. PATENT DOCUMENTS

| | | | |
|---|---|---|---|
| 6,031,631 A * | 2/2000 | Tahara et al. | 358/296 |
| 2002/0030840 A1* | 3/2002 | Itaki et al. | 358/1.13 |
| 2004/0066535 A1* | 4/2004 | Oyumi | 358/1.15 |
| 2004/0252331 A1* | 12/2004 | Wei | 358/1.15 |
| 2005/0018241 A1* | 1/2005 | Azami | 358/1.15 |
| 2005/0099438 A1* | 5/2005 | Lester et al. | 347/4 |
| 2005/0157336 A1* | 7/2005 | Koike et al. | 358/1.15 |
| 2006/0007482 A1* | 1/2006 | Nakahashi | 358/1.15 |
| 2006/0268304 A1* | 11/2006 | Tanaka et al. | 358/1.13 |

FOREIGN PATENT DOCUMENTS

| | | |
|---|---|---|
| JP | 11-321040 A | 11/1999 |
| JP | 2001-358895 A | 12/2001 |

* cited by examiner

*Primary Examiner* — Ming Hon
(74) *Attorney, Agent, or Firm* — Rossi, Kimms & McDowell LLP

(57) ABSTRACT

An image forming apparatus which is capable of efficiently registering apparatuses in a slave apparatus list. The image forming apparatus has a partner apparatus list as the slave apparatus list which stores information on the image forming apparatuses as candidate slave apparatuses so as to select a slave apparatus for use in executing cascade copy. When the image forming apparatus is selected as a master apparatus, a CPU thereof selects a slave apparatus from the image forming apparatuses registered in the partner apparatus list. When the image forming apparatus is selected as a slave apparatus, the CPU determine whether or not the information indicative of the copy mode has been received from a master apparatus. If the information indicative of cascade copy has been received, information on the master apparatus is stored in the partner apparatus list.

7 Claims, 11 Drawing Sheets

CASCADE COPY PARTNER SELECTION SCREEN

| USE | NAME | MODEL | STATUS |
|-----|------|-------|--------|
| ✓ | COPYING MACHINE B | MFP-B | AVAILABLE |
|   | COPYING MACHINE D | MFP-D | UNAVAILABLE |

IMAGE FORMING APPARATUS HAVING A MASTER-SLAVE CONFIGURATION AND CONTROL METHOD THEREFOR, AND CONTROL PROGRAM FOR IMPLEMENTING THE METHOD

BACKGROUND OF THE INVENTION

1. Field of the Invention

The present invention relates to an image forming apparatus in an image forming system including a plurality of image forming apparatuses communicably connected to each other, a control method therefor, and a control program for implementing the method.

2. Description of the Related Art

In an image forming system in which a plurality of copying machines are communicably interconnected via a network and the like, there is provided a copy mode configured to enable two or more copying machines to copy an image scanned by a scanner of one copying machine. The two or more copying machines may include the apparatus that scans the image from an original. This copy mode is called cascade copy (see e.g. Japanese Laid-Open Patent Publication (Kokai) No. 2001-358895). In cascade copy, when obtaining 100 copies, for example, by two copying machines 50 copies are printed by one of the copying machines, and at the same time another 50 copies are printed by the other, so that it is possible to reduce time required for the copying operation.

The above-described image forming system also provides another copy mode configured to enable a copying machine other than the copying machine that scanned an image by the scanner thereof, to print the image. This copy mode is called remote copy. In remote copy, it is possible to enable a copying machine e.g. in a remote place to print out the scanned image.

In general, in an image forming system in which cascade copy or remote copy can be performed, a copying machine which scans an original is referred to as a master apparatus, and a copying machine which receives scanned image data from the master apparatus is referred to as a slave apparatus.

In order to use the copy mode, such as cascade copy or remote copy, the user is required to register a slave apparatus in a master apparatus in advance. Specifically, the user is required to input information, such as an IP address, for identifying the slave apparatus, to the master apparatus in advance to thereby register the information in a slave apparatus list provided in the master apparatus. In executing the cascade copy or the remote copy, the user selects a slave apparatus from the slave apparatus list registered in the master apparatus, and then gives an instruction for scanning an original.

As described above, in the conventional cascade copy or remote copy, a user has to register slave apparatuses in a master apparatus by manual operation, and hence the operation is troublesome.

To eliminate the inconvenience of the manual operation for inputting information configuration on copying machines, it is envisaged for a copying machine newly set up for use to acquire configuration information on other existing machines via a network, and cause the acquired information to be reflected on the configuration information of its own (see e.g. Japanese Laid-Open Patent Publication (Kokai) No. H11-321040).

To solve the problem of the troublesome configuration in the prior art, it is convenient if an external apparatus can be automatically registered in the slave apparatus list when the copying machine receives image data from the external apparatus. However, not all types of external apparatuses are suitable as a slave apparatus. More specifically, if external apparatuses from which the copying machine receives image data are unconditionally added to the slave apparatus list, even apparatuses which are not capable of executing the above-mentioned copy modes are registered in the slave apparatus list.

SUMMARY OF THE INVENTION

The present invention provides an image forming apparatus which is capable of efficiently registering apparatuses in a slave apparatus list, a control method therefor, and a control program for implementing the method.

In a first aspect of the present invention, there is provided an image forming apparatus in an image forming system that includes a plurality of image forming apparatuses communicably connected to each other, and is configured to execute a copy mode in which an image forming apparatus selected as a master apparatus from the image forming apparatuses scans an image by a scanner thereof and transfers the scanned image to another image forming apparatus selected as a slave apparatus from the image forming apparatuses, to thereby cause the slave apparatus to print out the image, comprising a storage unit configured to store information on image forming apparatuses as candidate slave apparatuses so as to select a slave apparatus therefrom for use in executing the copy mode, a selection unit configured to be operable when the image forming apparatus is selected as the master apparatus, to select a slave apparatus from the image forming apparatuses stored in the storage unit, a transmission unit configured to transmit the image scanned by the scanner and information indicative of the copy mode to the slave apparatus selected by the selection unit, a determination unit configured to be operable when the image forming apparatus is selected as the slave apparatus, to determine whether or not the information indicative of the copy mode has been received from an image forming apparatus selected as the master apparatus, and a registration unit configured to be operable when the determination unit determines that the information indicative of the copy mode has been received, to register information on the image forming apparatus selected as the master apparatus, in the storage unit.

The image forming apparatus according to the first aspect of the present invention makes it possible to eliminate troublesome user operation for registering an apparatus in the slave apparatus list and more efficiently register the apparatus in the slave apparatus list.

The image forming apparatus further comprises a second determination unit configured to be operable when the determination unit determines that the information has been received, to determine whether or not the information on the image forming apparatus selected as the master apparatus has already been stored in the storage unit, wherein when the second determination unit determines that the information has not been stored yet, the configuration unit registers the information on the image forming apparatus selected as the master apparatus, in the storage unit.

The image forming apparatus further comprises a third determination unit configured to be operable when the determination unit determines that the image forming apparatus has received the information as the slave apparatus, to determine whether or not a function of the image forming apparatus will be restricted when the image forming apparatus is to execute the copy mode as the master apparatus, and when the third determination unit determines that the function will not be restricted, the registration unit registers the information on the image forming apparatus selected as the master apparatus, in the storage unit.

In the copy mode, the image scanned by the scanner of the image forming apparatus selected as the master apparatus can be caused to be printed using both the image forming apparatus selected as the master apparatus and the image forming apparatus selected as the slave apparatus.

In a second aspect of the present invention, there is provided a method of controlling an image forming apparatus in an image forming system that includes a plurality of image forming apparatuses communicably connected to each other, and is configured to execute a copy mode in which an image forming apparatus selected as a master apparatus from the image forming apparatuses scans an image by a scanner thereof and transfers the scanned image to another image forming apparatus selected as a slave apparatus from the image forming apparatuses, to thereby cause the slave apparatus to print out the image, the image forming apparatus having a storage unit configured to store information on image forming apparatuses as candidate slave apparatuses so as to select a slave apparatus therefrom for use in executing the copy mode, the method comprising a selection step of selecting a slave apparatus from the image forming apparatuses stored in the storage unit, when the image forming apparatus is selected as the master apparatus, a transmission step of transmitting the image scanned by the scanner and information indicative of the copy mode to the slave apparatus selected in the selection step, a determination step of determining whether or not the information indicative of the copy mode has been received from an image forming apparatus selected as the master apparatus, when the image forming apparatus is selected as the slave apparatus, and a registration step of registering information on the image forming apparatus selected as the master apparatus, in the storage unit, when it is determined in the determination step that the information indicative of the copy mode has been received.

In a third aspect of the present invention, there is provided a control program for causing a computer to execute a method of controlling an image forming apparatus in an image forming system that includes a plurality of image forming apparatuses communicably connected to each other, and is configured to execute a copy mode in which an image forming apparatus selected as a master apparatus from the image forming apparatuses scans an image by a scanner thereof and transfers the scanned image to another image forming apparatus selected as a slave apparatus from the image forming apparatuses, to thereby cause the slave apparatus to print out the image, the image forming apparatus having a storage unit configured to store information on image forming apparatuses as candidate slave apparatuses so as to select a slave apparatus therefrom for use in executing the copy mode, the control program comprising a selection module for selecting a slave apparatus from the image forming apparatuses stored in the storage unit, when the image forming apparatus is selected as the master apparatus, a transmission module for transmitting the image scanned by the scanner and information indicative of the copy mode to the slave apparatus selected by the selection module, a determination module for determining whether or not the information indicative of the copy mode has been received from an image forming apparatus selected as the master apparatus, when the image forming apparatus is selected as the slave apparatus, and a registration module for registering information on the image forming apparatus selected as the master apparatus, in the storage unit, when it is determined by the determination module that the information indicative of the copy mode has been received.

The features and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
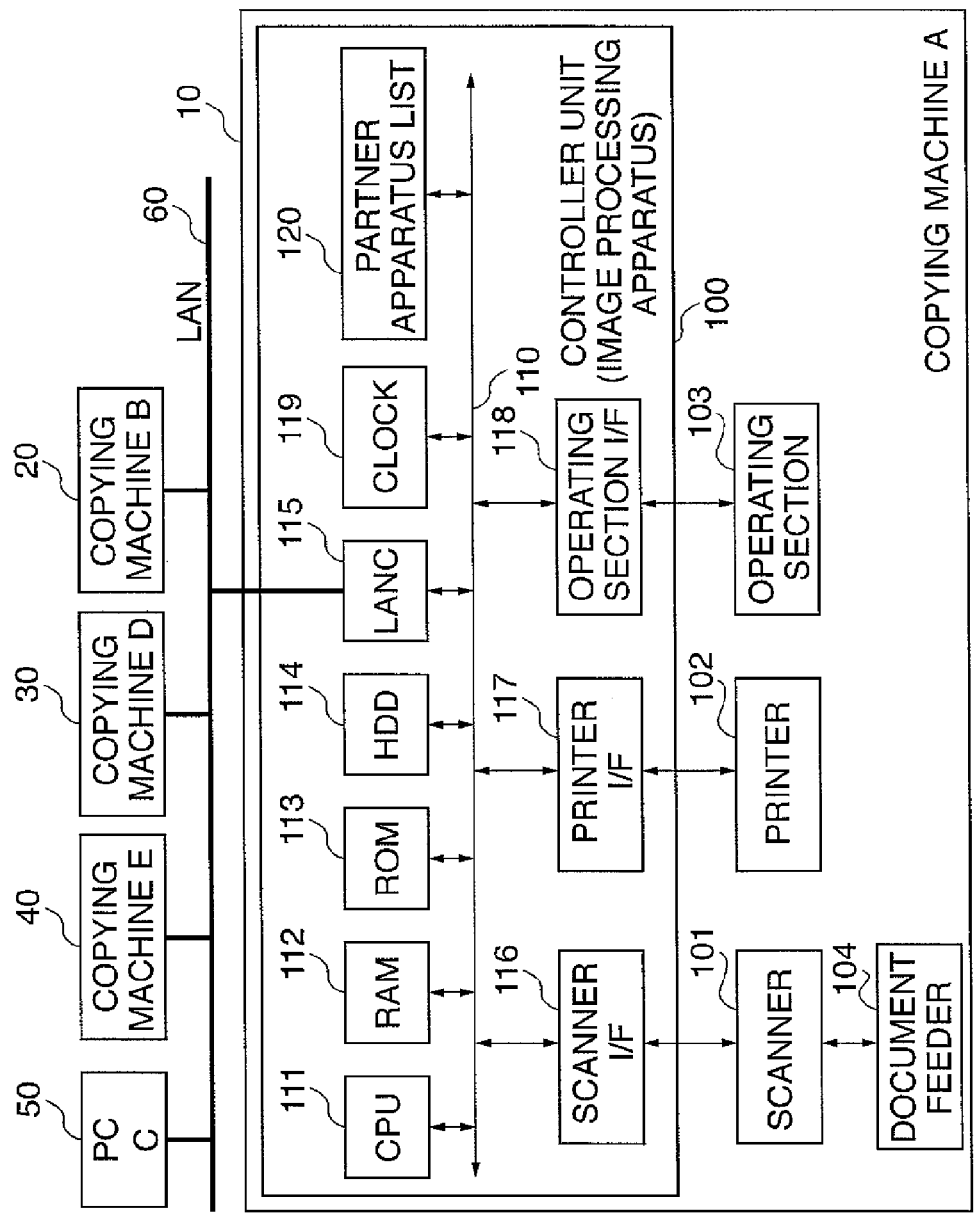
FIG. 1 is a functional block diagram of a copying machine in an image forming system, according to an embodiment of the present invention.

FIG. 1 is a functional block diagram of a copying machine in an image forming system, according to an embodiment of the present invention.

The present image forming system is comprised of four copying machines (digital multi-function machines) A 10, B 20, D 30, and E 40 and a PC 50 interconnected by a LAN 60.

Each of the copying machines corresponds to an image forming apparatus according to a first aspect of the present invention, and is capable of inputting and outputting images. More specifically, the copying machine inputs image information from sheet originals and prints out the image information on sheets. Input image information can be printed out on sheets or stored as digital data. Further, it is possible to transfer image information to another apparatus via the LAN 60. The copying machine is also capable of receiving copy data from the PC 50 or image information from another copying machine, and printing out the same on sheets. The PC 50 is a personal computer (PC) generally used as an information processing apparatus.

By interconnecting the apparatuses (copying machines) by the LAN 60, the image forming system makes it possible not only to carry out conventional copy processing by a single apparatus, but also to perform the cascade copy function and the remote copy function. It should be noted that although in the example shown in FIG. 1, the copying machines and the PC are interconnected via the LAN, they may be interconnected by a network other than the LAN, such as the Internet or a wireless network. Alternatively, a USB interface, a centronics interface, or the like interface may be used to interconnect a plurality of copying machines and/or PCs.

Further, although FIG. 1 shows, by way of example, a case where the copying machines as image forming apparatuses and the PC as an image processing apparatus are connected to each other, other kinds of apparatuses, such as a printer, a scanner, and a facsimile machine, may also be connected.

A description will be given of the configuration of the copying machine 10 in FIG. 1. It is assumed that the other copying machines 20, 30, and 40 have the same configuration as that of the copying machine 10.

A controller unit 100 is connected to a scanner 101 as an image input device, a printer 102 as an image output device, and an operating section 103 on one hand, and are connected to the LAN 60 on the other hand, so as to input and output image information and device information. The scanner 101 is connected to a document feeder 104.

Blocks within the controller unit 100 are interconnected by an internal bus 110. A CPU 111 is a processor that controls the overall operation of the system. A RAM 112 is a system work memory for operating the CPU 111. The RAM 112 is also used as an image memory for temporarily storing image data.

A ROM 113 stores a boot program for the system. An HDD 114 stores system software, image data, software counter values, and so forth. The system software is a program for realizing functions including a copy function, a step SCAN function, and a printer function. The system software operates by being loaded into the RAM 112.

A software counter is configured to have sheet size-specific counter regions and processed data volume-specific counter regions, and count-up is executed by calculating the number of sheets used for image output and the volume of data processed by the CPU 111 with reference to an arbitrary reference volume value set in advance, respectively. The counts may be stored not in the HDD 114, but in storage areas provided e.g. in an EEPROM, not shown, insofar as they can be held even after the power is turned off.

A LANC (Local Application Control bus system) 115 is connected to the LAN 60 to input/output image data and information concerning apparatus control. The LANC can also receive image data to be output, from any of the PC 50 and the other copying machines 20, 30, and 40 on the network, and perform image output, or transmit image data input by the copying machine 10 itself.

A scanner I/F 116 is connected to the scanner 101 for communication with the CPU of the same. Further, the scanner I/F 116 performs synchronous-to-asynchronous or asynchronous-to-synchronous conversion of image data. A printer I/F 117 is connected to the printer 102 for communication with the CPU of the same. Further, the printer I/F 117 performs synchronous-to-asynchronous or asynchronous-to-synchronous conversion of image data.

An operating section I/F 118 provides interface with the operating section 103 to output image data to be displayed on the operating section 103. Further, the operating section I/F 118 plays the role of transferring information input by the user of the present system via the operating section 103 to the CPU 111.

An input operation performed via the operating section 103 is recognized and processed via the operating section I/F 118 based on a program executed by the CPU 111. The configuration or setup of the entire apparatus and the giving of an instruction for executing a selected function enable execution of copy, scan, etc.

A clock 119 provides date and time information. The clock 119 can be accessed via the CPU 111, and is used for date and time management of reports and logs. The clock 119 can be backed up by a battery, though not shown, so as to hold the date and time information even after the power-off of the apparatus.

Reference numeral 120M designates a storage device that stores a partner apparatus list 120. The partner apparatus list 120 manages copying machines and the like apparatus an arbitrary one of which can be designated as a partner apparatus for execution of a copy mode, such as a cascade copy mode or a remote copy mode.

Figure 2:
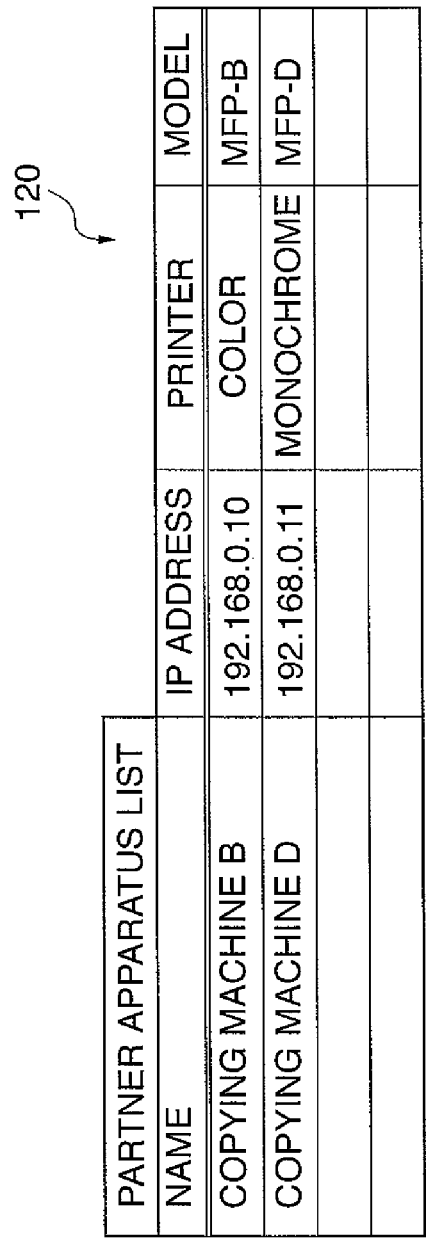
FIG. 2 is a diagram showing an example of a partner apparatus list provided in the copying machine in FIG. 1.

FIG. 2 is a diagram showing an example of the partner apparatus list appearing in FIG. 1. The partner apparatus list 120 shown in FIG. 2 stores IP addresses, model information, printer functions, processable image formats, installed options, etc. associated with respective partner apparatuses for cascade copy or remote copy. The partner apparatus list 120 may be stored in the HDD 114 or the RAM 112.

Before execution of cascade copy or remote copy, it is required, first of all, to register a partner apparatus in the partner apparatus list 120. The partner apparatus is designated for execution of cascade copy or remote copy, based on the partner apparatus list 120.

Figure 3:
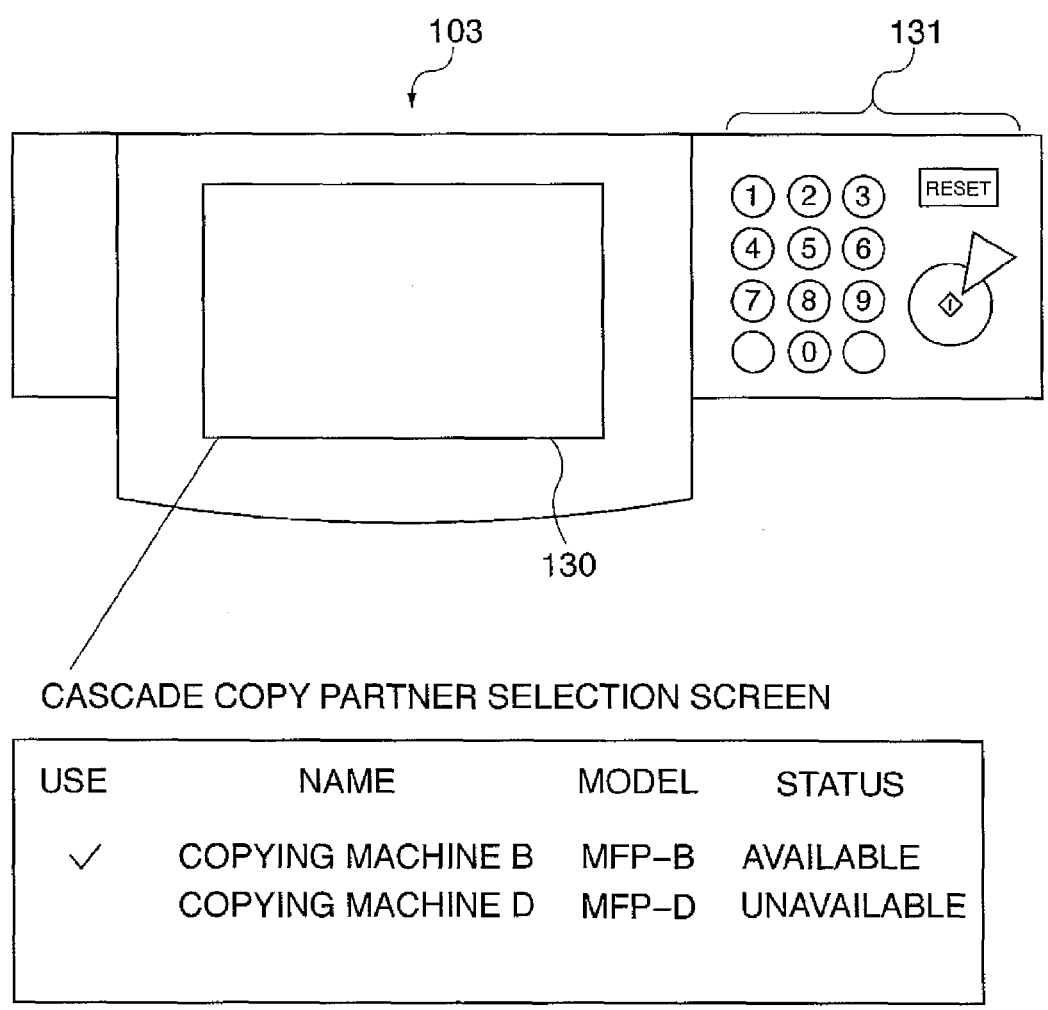
FIG. 3 is a view of the appearance of an operating section of the copying machine in FIG. 1.

FIG. 3 is a view of the appearance of the operating section appearing in FIG. 1. As shown in FIG. 3, the operating section 103 is comprised of a touch panel 130 and push buttons 131. The touch panel 130 not only displays images, but also functions as an input device. A user can perform an input operation by touching the touch panel 130. Contents of the partner apparatus list 120 are displayed on the touch panel 130, and the user gives an instruction for executing cascade copy or remote copy and designates a partner apparatus for the cascade copy or the remote copy. The push buttons 131 are used to enter numerical values by ten keys or give an instruction for starting a copy operation or the like operation.

Now, a description will be given of a processing mode 1 in which a master apparatus and a slave apparatus are of the same model in a case where the copying machine B 20 is designated for cascade copy or remote copy by the copying machine A 10 which has the copying machine B 20 registered in the partner apparatus list 120 thereof. First, a description will be given of the concept of processing executed in a case where a master apparatus is registered in a partner apparatus list, with reference to FIG. 4.

When the user desires to perform cascade copy or remote copy from the master apparatus (copying machine A) using the slave apparatus (copying machine B), the user sets an original on the copying machine A 10, designates a partner apparatus via the operating section 103, and then gives an instruction for starting cascade copy or remote copy. After scanning the original, the copying machine A as the master apparatus sends the scanned image to the copying machine B as the slave apparatus.

At the same time, the copying machine A transmits an attribute indicative of cascade copy or remote copy to the copying machine B as the slave apparatus together with the scanned image. The copying machine B, which receives the attribute indicative of cascade copy or remote copy together with the image, adds the copying machine A 10 to a partner apparatus list of its own. This eliminates the need to manually register the IP address of the copying machine A 10 each time the user desires to carry out cascade copy or remote copy from the copying machine B (current slave apparatus) to the copying machine A (current master apparatus), to thereby saving time and labor required for registration. This processing will be described in detail with reference to FIGS. 5 and 6.

Figure 4:
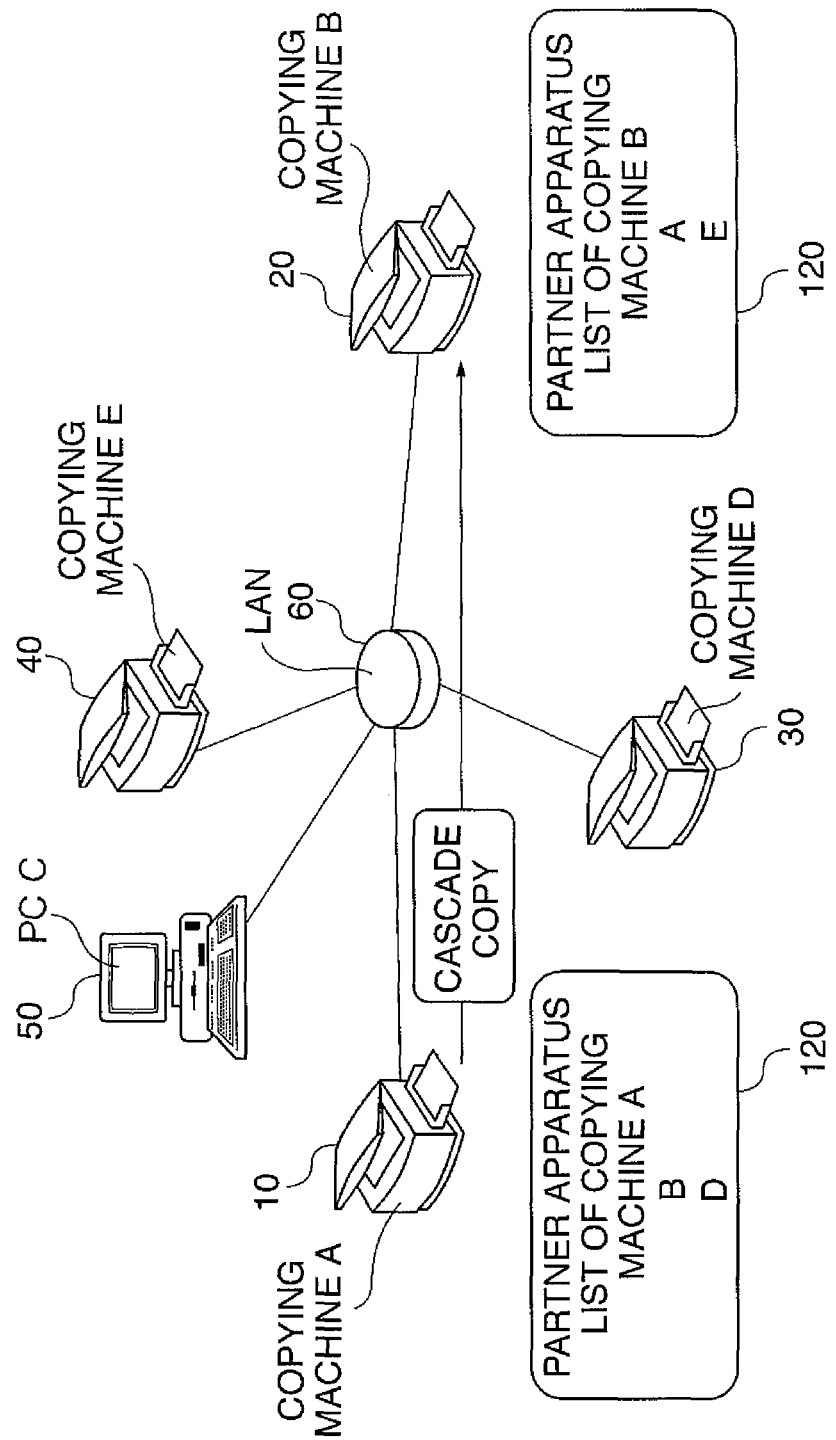
FIG. 4 is a conceptual view illustrating a case where a master apparatus is registered in the partner apparatus list in a processing mode 1 executed by the image forming system.
Figure 5:
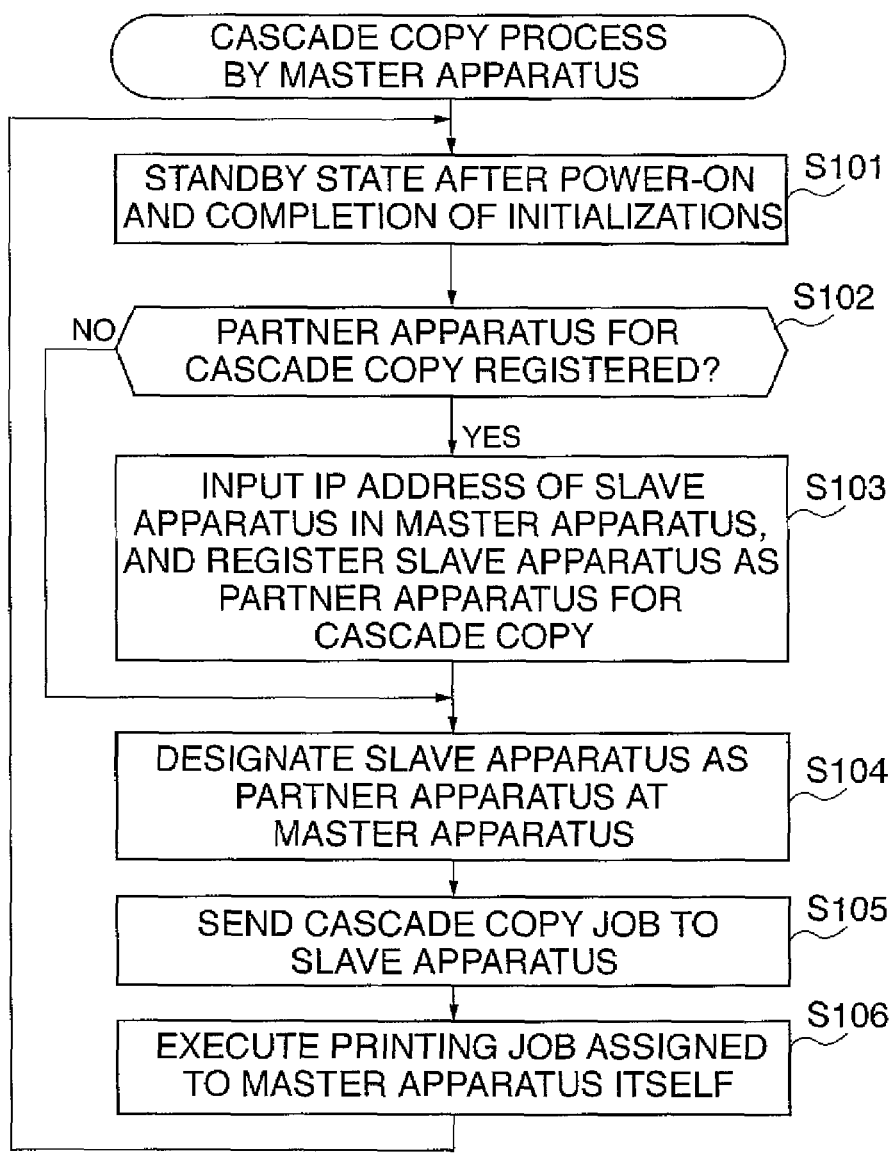
FIG. 5 is a flowchart of a cascade copy process executed by the master apparatus in FIG. 4.

FIG. 5 is a flowchart of a cascade copy process executed by the master apparatus (copying machine A 10) appearing in FIG. 4. The present process is executed by the CPU 111 appearing in FIG. 1 according to user operation.

In FIG. 5, first, in a step S101, the copying machine A 10 is in a standby state after power-on thereof and completion of various initializations. When the user operates the operating section 103 of the master apparatus (copying machine A 10) in this state so as to execute printing by cascade copy, the process proceeds to a step S102.

In the case of carrying out cascade copy, it is required that a partner apparatus has been registered in the partner apparatus list 120. Therefore, first in the step S102, it is determined whether or not a desired partner apparatus has been registered in the partner apparatus list 120. If the partner apparatus has already been registered, it is not required to register the partner apparatus anew, so that the process proceeds to a step S104. On the other hand, if the partner apparatus has not been registered yet, the process proceeds to a step S103.

In the step S103, the user inputs the IP address of the copying machine B 20 to the copying machine A 10 to thereby register the copying machine B 20 in the partner apparatus list 120. When the IP address is input, the copying machine A 10 makes an inquiry to the copying machine B 20, and acquires various information items required for cascade copy or remote copy and stores these in the partner apparatus list 120. For example, there are stored an IP address of the copying machine B 20 of 192.168.0.10, an apparatus name of Copying Machine B, a model name of MFP-B, and other information items, such as installed options and sheet sizes. Then, the process proceeds to the step S104.

The user sets an original on the copying machine A 10 and gives an instruction for execution of an cascade copy operation. In response to this instruction, in the step S104, the copying machine A 10 scans the set original by the scanner 101 and generates image data to be sent to the copying machine B as the slave apparatus. If the present job is cascade copy, the image data is generated by adding an attribute indicative of cascade copy to the scanned image. It should be noted that if the designated job is remote copy, the image data is generated by adding an attribute indicative of remote copy to the scanned image. The scanned image and the attribute indicative of cascade copy or remote copy may be sent separately.

In a step S105, the image data generated in the step S104 is sent to the copying machine B 20. More specifically, in the illustrated example, the image scanned by the scanner 101 and the attribute indicative of cascade copy are sent to the copying machine B. The copying machine B 20 executes a printing operation based on the received image data, as described hereinafter with reference to FIG. 6.

In a step S106, the copying machine A 10 executes printing associated with a print job assigned thereto for printing the image scanned in the step S104. For example, in the case of taking ten copies from a ten-sheet original document by cascade copy, it is possible to print a total of one hundred sheets by causing each of the copying machine A 10 and the copying machine B 20 to print fifty sheets for copying. When the cascade copy is completed, the process returns to the step S101.

Although FIG. 5 shows an example of cascade copy, the process may be applied to remote copy in which the copying machine A 10 performs only an original scanning operation and the copying machine B 20 performs a printing operation. In this case, the step S106 is omitted.

Figure 6:
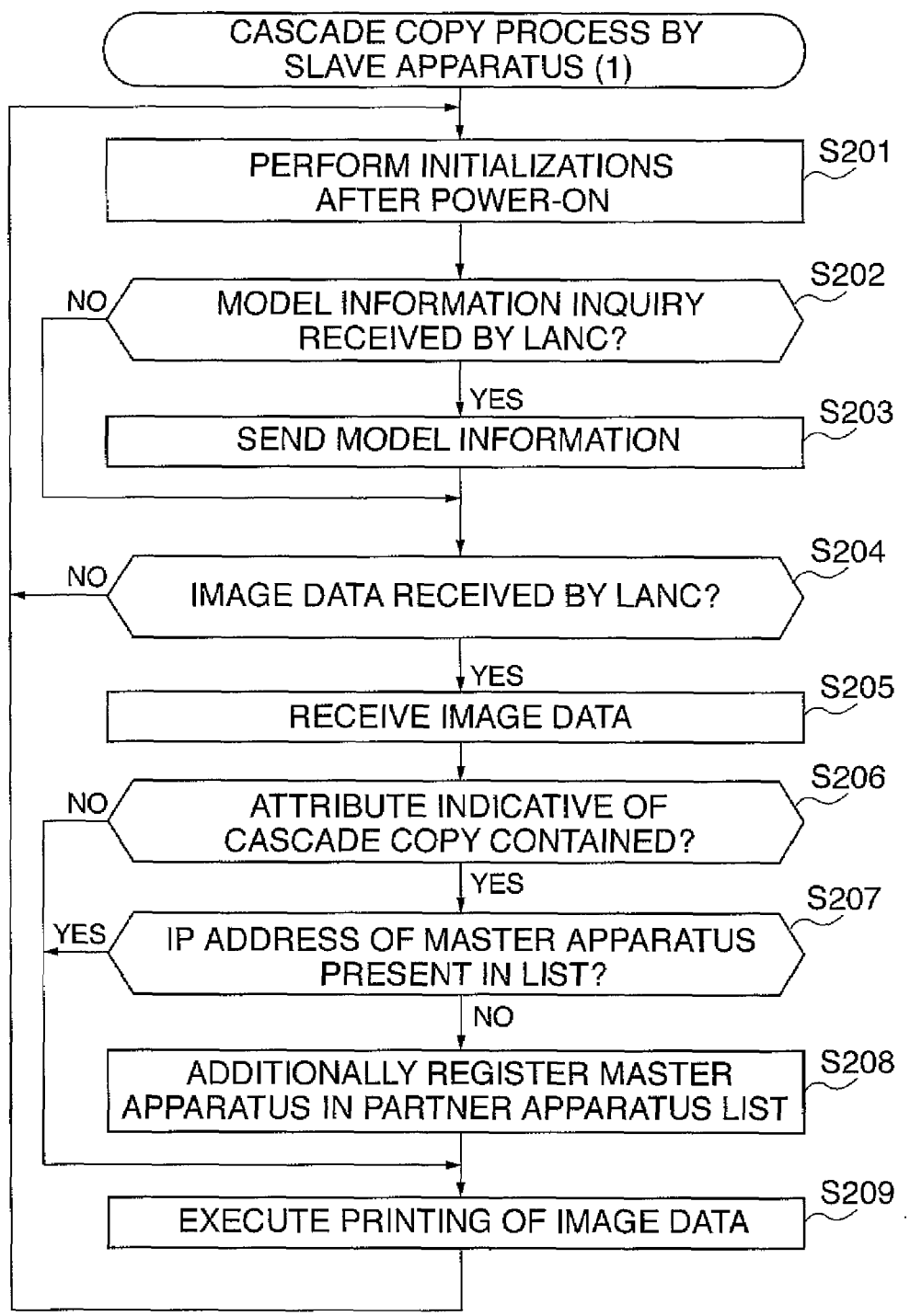
FIG. 6 is a flowchart of a cascade copy process executed by a slave apparatus appearing in FIG. 4.

FIG. 6 is a flowchart of a cascade copy process executed by the slave apparatus (copying machine B 20) appearing in FIG. 4. The present process is executed by the CPU 111 of the copying machine B 20 corresponding to the CPU 111 of the copying machine A 10 appearing in FIG. 1.

As shown in FIG. 6, first in a step S201, the power of the copying machine B 20 is turned on and various initializations are performed.

In a step S202, it is determined whether or not the LANC 115 has received an apparatus information inquiry made with a view to registering a partner apparatus for cascade copy. If the LANC 115 has not received the apparatus information inquiry, the process proceeds to a step S204, whereas if the LANC 115 has received the apparatus information inquiry, the process proceeds to a step S203.

In the step S203, apparatus information is sent to the copying machine A 10. Then, the process proceeds to the step S204. The copying machine A 10 registers the copying machine B 20 in the partner apparatus list 120 of its own based on the received apparatus information.

In the step S204, it is determined whether or not the LANC 115 has received image data. If the LANC 115 has not received image data, the process returns to the step S202, whereas if the LANC 115 has received image data, the process proceeds to a step S205. In the step S205, the copying machine B 20 receives the image data, followed by the process proceeding to a step S206.

In the step S206, it is determined whether or not the received image data has the attribute indicative of cascade copy added thereto. If the received image data does not have the attribute added thereto, the process proceeds to a step S209, whereas if the received image data has the attribute added thereto, the process proceeds to a step S207.

In the step S207, it is determined whether or not the IP address of the copying machine A 10 as the sender of transmission of the received job, i.e. as the master apparatus is present in the partner apparatus list 120 of the copying machine B 20. The IP address of the sender can be discriminated based on the data structure of the received job. If the IP address of the master apparatus is present in the partner apparatus list of the slave apparatus, i.e. if the IP address has already been registered, the process proceeds to the step S209. If the IP address of the master apparatus is not present in the partner apparatus list of the slave apparatus, i.e. if the IP address has not been registered yet, the process proceeds to a step S208.

In the step S208, since the IP address of the master apparatus has not been registered in the partner apparatus list of the slave apparatus, the IP address of the master apparatus (copying machine A) is automatically registered in the partner apparatus list of the slave apparatus (copying machine B). This eliminates the need for the user to manually enter the IP address.

More specifically, the copying machine B 20 makes an inquiry to the copying machine A 10, and acquires various information items required for cascade copy and stores these in the partner apparatus list 120. For example, there are stored an IP address of the copying machine A 10 of 192.168.0.9, an apparatus name of Copying Machine A, a model name of MFP-A, and other information items, such as installed options. Then, the process proceeds to the step S209.

In the step S209, print processing of the received image data is carried out. The print processing includes error handling executed when paper jamming has occurred or when recording paper has run out. When the print processing is completed, the process returns to the step S202.

Next, a case where the copying machine B is designated from the PC 50 appearing in FIG. 1 for execution of print processing (i.e. a case where a master apparatus is not registered in a partner apparatus list) will be described with reference to FIG. 7. First, a description will be given of the concept of processing in this case.

When the user desires to execute print processing using the copying machine B 20, the user designates a partner apparatus from the PC 50, and executes the print processing. After image data formation is performed by the PC 50 via a printer driver, the image data is sent to the copying machine B 20. In this case, the image data does not contain the attribute indicative of cascade copy, and hence the PC 50 is not added to the partner apparatus list of the copying machine B 20.

Since the PC 50 cannot be used as a partner for cascade copy, it is practical and convenient not to register the PC 50 in the partner apparatus list of the copying machine B 20. In the following, a description will be given of processing executed by the PC 50.

Figure 7:
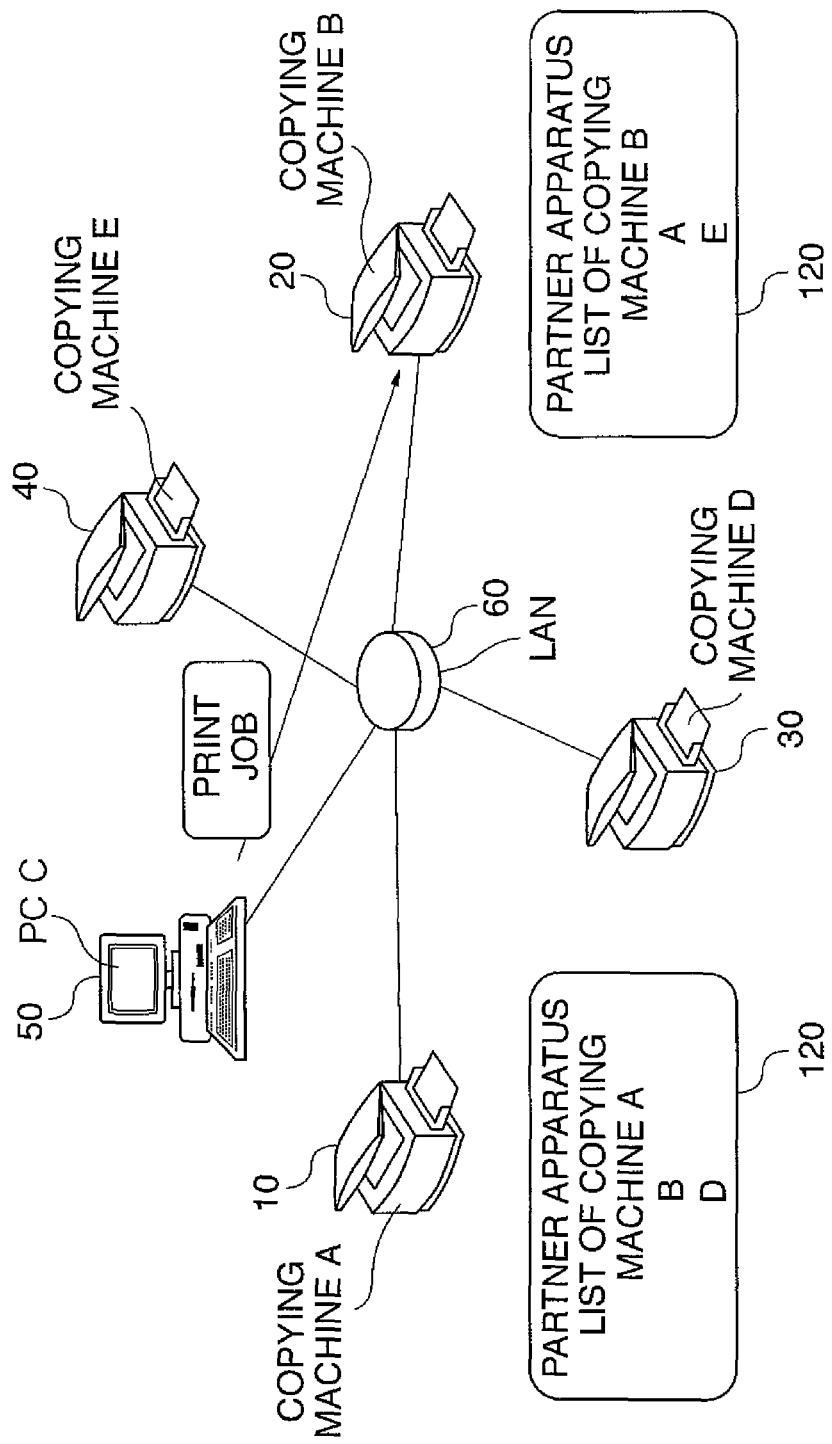
FIG. 7 is a conceptual view illustrating a case where a master apparatus is not registered in the partner apparatus list in the processing mode 1 executed by the image forming system.
Figure 8:
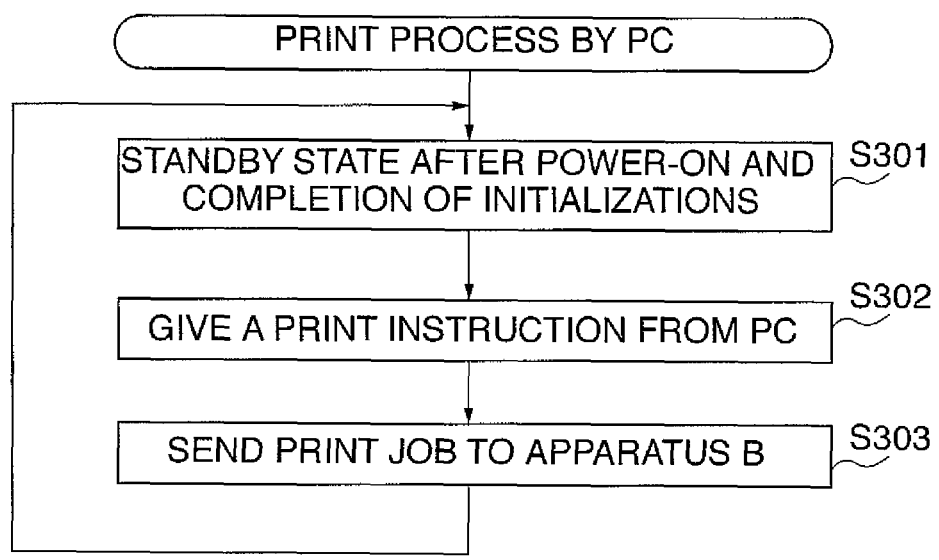
FIG. 8 is a flowchart of a printing process executed by a PC (master apparatus) appearing in FIG. 7.

FIG. 8 is a flowchart of a printing process executed by the PC appearing in FIG. 7.

In FIG. 8, first, in a step S301, the PC 50 is in a standby state after power-on and completion of various initializations.

In a step S302, the user designates the copying machine B 20 and gives a print instruction to the same. Image data is formed by the PC 50 via the printer driver. Then, the process proceeds to a step S303.

In the step S303, the image data is sent to the copying machine B 20. The copying machine B 20 carries out print processing based on the received image data. When the print processing is completed, the process returns to the step S301.

The processing executed by the copying machine B 20 is the same as that described with reference to FIG. 6, and therefore description thereof is omitted.

In the present case, since the PC 50 is not capable of cascade copy, the IP address of the PC 50 is not registered in the partner apparatus list 120 of the copying machine B 20. This makes it possible to eliminate a wasteful operation, thereby making a partner apparatus list update operation practical and convenient.

As described above, according to the processing mode 1, if a master apparatus and a slave apparatus are capable of cascade copy or remote copy, it is possible to automatically perform IP address configuration. Further, if a master apparatus is a PC or the like which is not capable of cascade copy, registration of the IP address of the master apparatus is not performed. Therefore, the processing mode 1 is excellent in user-friendliness in that practical update of the partner apparatus list can be achieved.

In the following, a description will be given of a processing mode 2. The processing mode 2 is distinguished from the above-described processing mode 1 in which a master apparatus and a slave apparatus are of the same model, in that the model of a master apparatus is different from that of a slave apparatus.

First, the concept of processing in a case where cascade printing or remote printing is carried out from a lower-level model using a higher-level model will be described with reference to FIG. 9.

When the user desires to perform cascade copy or remote copy from the master apparatus (copying machine A) using the slave apparatus (copying machine B), the user sets an original on the copying machine A 10, designates a partner apparatus via the operating section 103, and then gives an instruction for starting the cascade copy or the remote copy. It is assumed that the master apparatus (copying machine A) is a monochrome printer and the slave apparatus (copying machine B) a color printer.

After scanning the original, the copying machine A sends image data for the cascade copy or the remote copy to the copying machine B 20. Although the image data contains the attribute indicative of cascade copy or remote copy, the color copy functions are restricted when cascade copy or remote copy is to be executed by inverting the master-slave relationship between the copying machine B and the copying machine A, and hence the copying machine A as the sender of transmission is not automatically added to the partner apparatus list of the copying machine B.

If the user desires to perform cascade copy or remote copy afterward in the direction from the copying machine B to the copying machine A by inverting the master-slave relationship therebetween, the user can register the IP address by a manual input operation even though the functions will be restricted. In the following, a description will be given of this processing.

Processing executed by the copying machine A 10 as the master apparatus is the same as that described with reference to FIG. 5, and hence description thereof is omitted. Hereafter, processing executed by the copying machine B 20 as the slave apparatus will be described with reference to FIG. 10.

Figure 9:
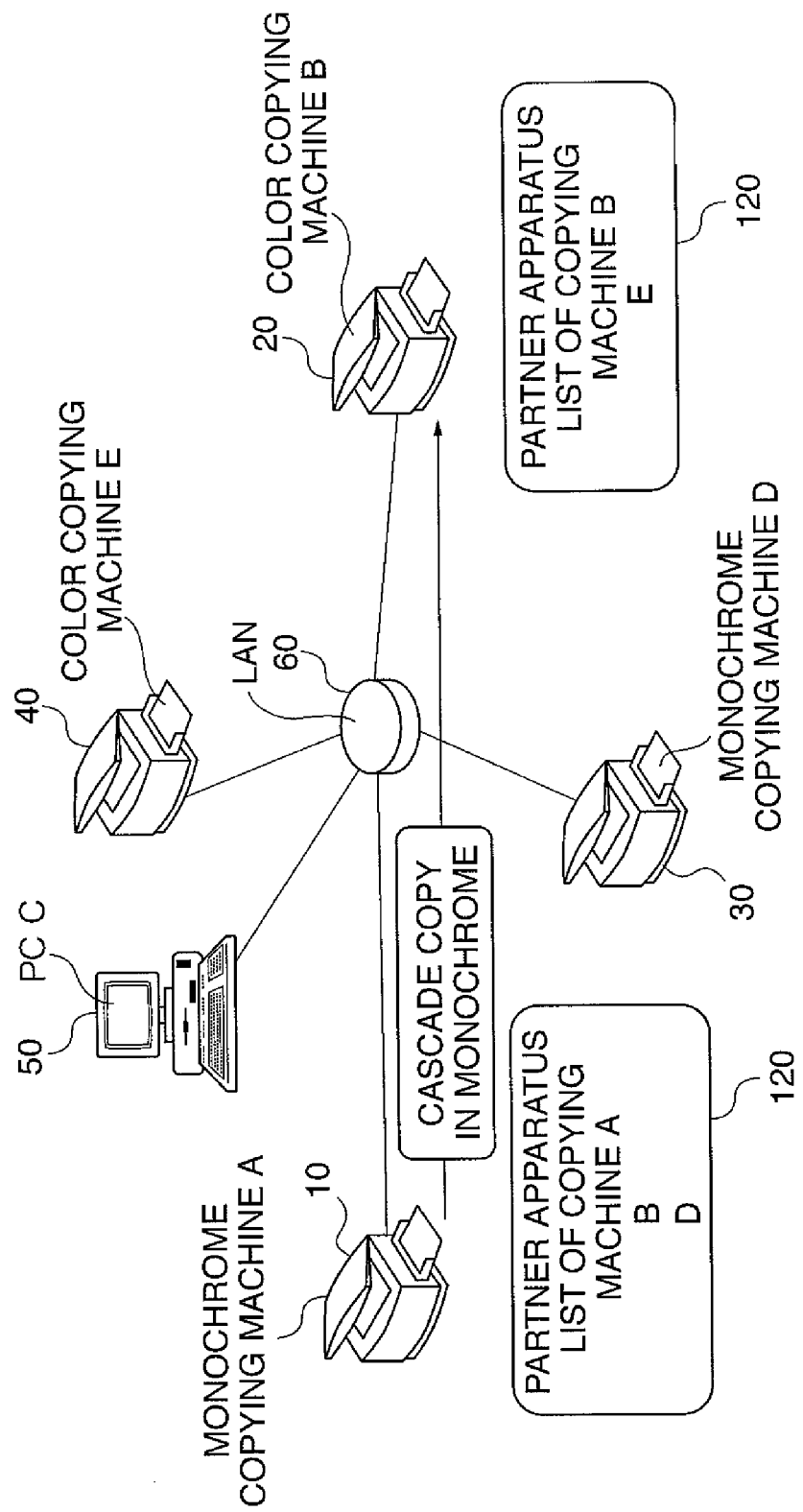
FIG. 9 is a conceptual view illustrating a case where a master apparatus is not registered in the partner apparatus list in a processing mode 2 executed by the image forming system.
Figure 10:
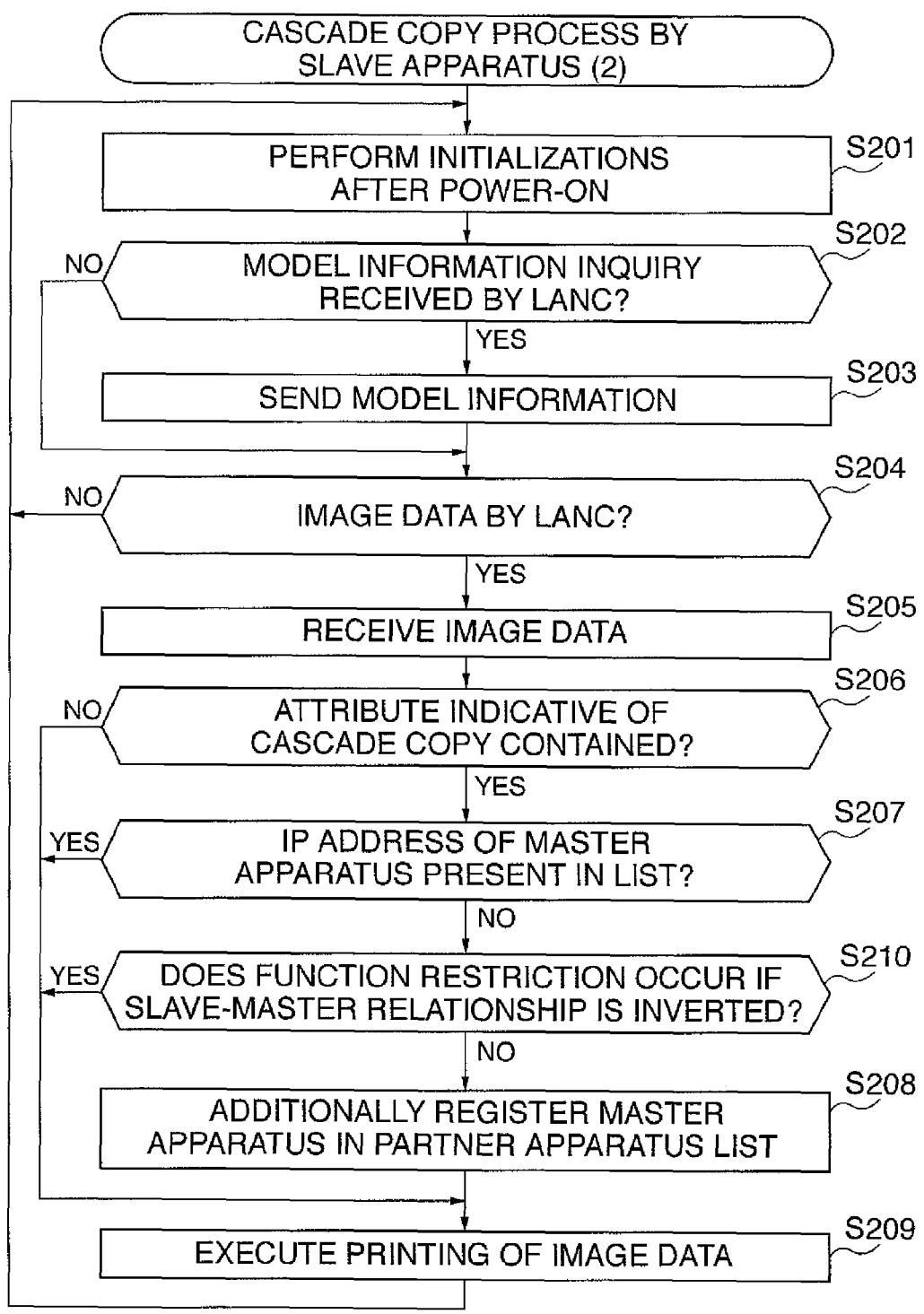
FIG. 10 is a flowchart of a cascade copy process executed by a slave apparatus appearing in FIG. 9.

FIG. 10 is a flowchart of a cascade copy process executed by the slave apparatus (copying machine B 20) appearing in FIG. 9.

The flowchart in FIG. 10 is formed by adding a step S210 to the flowchart in FIG. 6. Therefore, the former flowchart is distinguished from the latter only by the step S210.

In the step S206, it is determined whether or not the attribute indicative of cascade copy has been added to received image data. If the attribute has not been added to the received image data, the process proceeds to a step S209, whereas if the attribute has been added to the received image data, the process proceeds to a step S207.

In the step S207, it is determined whether or not the IP address of the copying machine A 10 as the sender of transmission of the received image data, i.e. as the master apparatus, is present in the partner apparatus list 120 of the copying machine B 20. The IP address of the sender can be discriminated based on the data structure of the received image data. If the IP address of the master apparatus is present in the partner apparatus list of the slave apparatus, i.e. if the IP address has already been registered, the process proceeds to the step S209. If the IP address of the master apparatus is not present in the partner apparatus list of the copying machine B 20, i.e. if the IP address has not been registered yet, the process proceeds to the step S210.

In the step S210, it is determined whether or not function restriction occurs if cascade copy is performed by inverting the master-slave relationship. The functions of the master apparatus can be known by making a model information inquiry from the slave apparatus to the master apparatus, for registration of a cascade copy partner apparatus. If the image data received by the slave apparatus contains the attribute indicative of cascade copy and if function restriction does not occur when performing cascade copy by inverting the master-slave relationship, the process proceeds to a step S208. The step S208 corresponds to a process executed in a case shown in FIG. 11, and hence it will be described in detail hereinafter.

On the other hand, if the functions are restricted (if function restriction occurs in the color copy, or if there is a difference in capability because a lower-level model is used as a slave apparatus and a higher-level model is used as a master apparatus, or if the installed options are different the apparatuses, for example) when performing cascade copy by inverting the master-slave relationship therebetween, as is the case with the example illustrated in FIG. 9, the process immediately proceeds to the step S9 without executing the step S208.

In the step S209, print processing of the received image data is carried out. The print processing includes error handling executed when paper jamming has occurred or when recording paper has run out. When the print processing is completed, the process returns to the step S202. As described above, in a case where function restriction occurs when image data is received, a sender of transmission is not registered in the partner apparatus list on the receiving end, so that practical configuration in the partner apparatus list can be automatically performed, which enhances user-friendliness.

Figure 11:
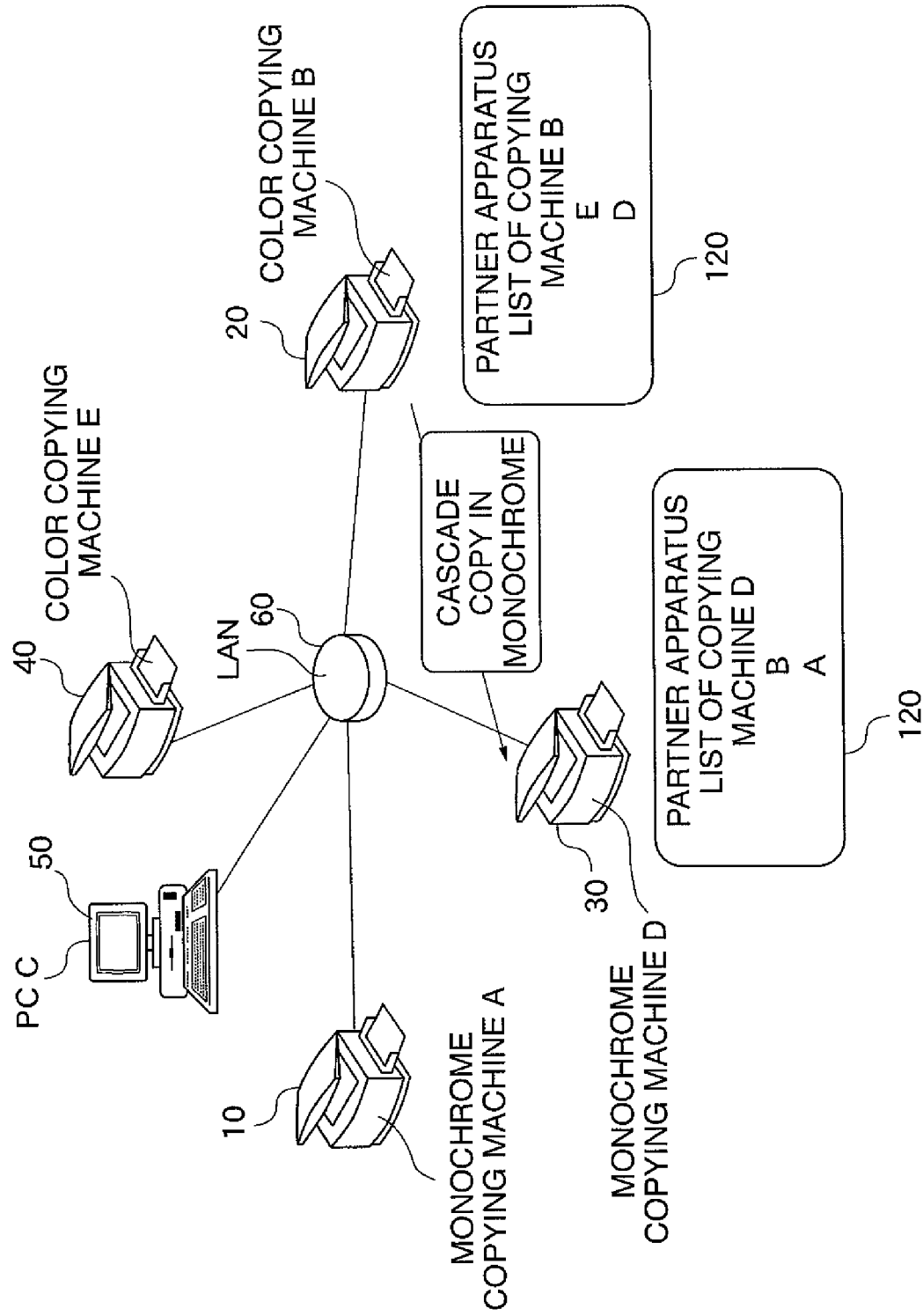
FIG. 11 is a conceptual view illustrating a case where a master apparatus is registered in the partner apparatus list in the processing mode 2 executed by the image forming system.

Next, the concept of processing in a case where cascade printing or remote printing is carried out in a direction from a higher-level model to a lower-level model will be described with reference to FIG. 11.

When the user desires to perform cascade copy in a direction from a master apparatus (copying machine B) to a slave apparatus (copying machine C), the user sets an original on the copying machine B 20, designates the partner apparatus via the operating section 103, and then gives an instruction for starting the cascade copy.

In the present case, the master apparatus (copying machine B) is a color printer while the slave apparatus (copying machine C) is a monochrome printer. After the original is scanned, image data for cascade copy in monochrome is sent to the copying machine C 30.

The image data contains the attribute indicative of cascade copy, and the monochrome copy function is not restricted in a cascade copy operation to be executed by inverting the master-slave relationship between the copying machine C and the copying machine B. Therefore, the sender B is automatically added to the partner apparatus list of the copying machine C 30. In the following, a description will be given of the processing.

Processing executed by the master apparatus (copying machine B 20) is the same as that described with reference to FIG. 5, and hence description thereof is omitted.

An essential part of processing executed by the slave apparatus (copying machine C 30) will be described below with reference to FIG. 10. The process executed in the case illustrated in FIG. 11 is distinguished from that executed in the case illustrated in FIG. 9 only by a determination in the step S210.

In the step S210, it is determined that function restriction does not occur in the case of performing cascade copy by inverting the master-slave relationship between the copying machines, and therefore the process proceeds to the step S208, wherein the sender (copying machine B) is automatically registered in the partner apparatus list of the slave apparatus (copying machine C).

More specifically, in the step S208, since the IP address of the master apparatus has not been registered in the partner apparatus list of the slave apparatus yet, and the function is not restricted in the case of performing cascade copy by inverting the master-slave relationship, the IP address of the master apparatus is automatically registered in the partner apparatus list 120 of the slave apparatus. In this case, it is not required to enter the IP address by a manual operation.

For example, there are stored an IP address of the copying machine B 20 of 192.168.0.10, an apparatus name of Copying Machine B, a model name of MFP-B, and other information items, such as installed options. Then, the process proceeds to the step S209.

As described above, when image data is received, if function restriction does not occur even when the mater-slave relationship is inverted, a sender of transmission is registered in the partner apparatus list at the receiving end, so that registration of the partner apparatus into the partner apparatus list can be automatically performed, which enhances user-friendliness. Although in the example shown in FIG. 10, cascade copy is executed, the process also applies to a case where remote copy is executed.

It is to be understood that the present invention may also be realized by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2006-318659 filed Nov. 27, 2006, which is hereby incorporated by reference herein in its entirety.

What is claimed is:

1. An image forming apparatus suitable to be used as either one of a slave apparatus and a master apparatus in a specified copy mode in which the master apparatus reads image data to transmit the image data to the slave apparatus, and the slave apparatus prints out the image data, the image forming apparatus comprising:
   a receiving unit configured to receive image data from an external device;
   a determination unit configured to determine whether or not the received image data is the image data to be printed out in the specified copy mode;
   a printing unit configured to activate the image forming apparatus as the slave apparatus to print out the received image data in the specified copy mode in the case where said determination unit determines that the received image data is the image data to be printed out in the specified copy mode; and a storing unit configured to store, before the image forming apparatus is activated as the master apparatus, information of the external device, so that the external device can be selected as the slave apparatus when the image forming apparatus is activated as the master apparatus, wherein the information of the external device includes an IP address, and one or more of a model name of the external device, installed options of the external device and processable image formats of the external device.

2. An image forming apparatus as claimed in claim 1, further comprising a second determination unit configured to determine whether or not the information of the external device has been already stored by said storing unit in the case where said determination unit determines that the received image data is the image data to be printed out in the specified copy mode, wherein said storing unit stores the information of the external unit in the case where said second determination unit determines that the information of the external device has not been already stored by said storing unit.

3. An image forming apparatus as claimed in claim 1, further comprising a third determination unit configured to determine whether or not function of a first copy process in the specified copy mode, in which the image forming apparatus is activated as the master apparatus and the external devise is activated as the slave apparatus, is restricted more than function of a second copy process when said printing unit prints out the received image data in the specified copy mode, wherein said storing unit stores the information of the external device in the case where said third determination unit determines that the function of the first copy process is not restricted more than the function of the second copy process.

4. An image forming apparatus as claimed in claim 1, wherein the specified copy mode is a cascade copy mode in which the master apparatus reads image data and both of the master apparatus and the slave apparatus print out the image data.

5. An image forming apparatus as claimed in claim 1, wherein the specified copy mode is a remote copy mode in which the master apparatus reads image data and the slave apparatus prints out the image data while the master apparatus does not print out the image data.

6. A method of controlling an image forming apparatus suitable to be used as either one of a slave apparatus and a master apparatus in a specified copy mode in which the master apparatus reads image data to transmit the image data to the slave apparatus, and the slave apparatus prints out the image data, the method comprising:

a receiving step of receiving image data from an external device;

a determination step of determining whether or not the received image data is the image data to be printed out in the specified copy mode;

a printing step of activating the image forming apparatus as the slave apparatus to print out the received image data in the specified copy mode in the case where it is determined in said determination step that the received image data is the image data to be printed out in the specified copy mode; and a storing step of storing, before the image forming apparatus is activated as the master apparatus, information of the external device, so that the external device can be selected as the slave apparatus when the image forming apparatus is activated as the master apparatus;

wherein the information of the external device includes an IP address, and one or more of a model name of the external device, installed options of the external device and processable image formats of the external device.

7. A non-transitory computer-readable recording medium storing a program to be executed by a computer, the program causing the computer to execute the steps of a method of controlling an image forming apparatus suitable to be used as either one of a slave apparatus and a master apparatus in a specified copy mode in which the master apparatus reads image data to transmit the image data to the slave apparatus, and the slave apparatus prints out the image data, the method comprising:

a receiving step of receiving image data from an external device;

a determination step of determining whether or not the received image data is the image data to be printed out in the specified copy mode;

a printing step of activating the image forming apparatus as the slave apparatus to print out the received image data in the specified copy mode in the case where it is determined in said determination step that the received image data is the image data to be printed out in the specified copy mode; and a storing step of storing, before the image forming apparatus is activated as the master apparatus, information of the external device, so that the external device can be selected as the slave apparatus when the image forming apparatus is activated as the master apparatus;

wherein the information of the external device includes an IP address, and one or more of a model name of the external device, installed options of the external device and processable image formats of the external device.

* * * * *